Figure 1:
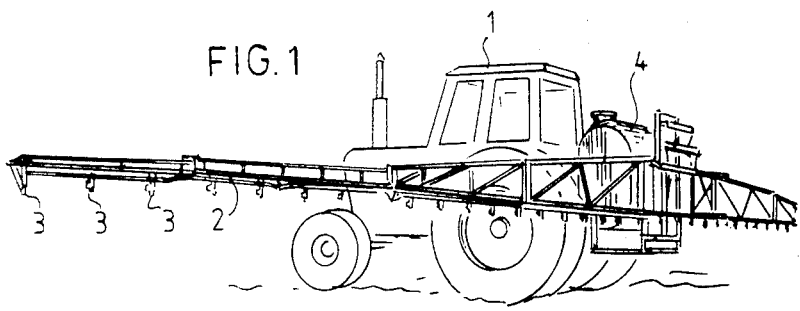

United States Patent [19]

van Zweeden

[11] Patent Number: 4,721,245

[45] Date of Patent: Jan. 26, 1988

[54] METHOD AND AN APPARATUS FOR SPRAYING A LIQUID

[75] Inventor: Adriaan van Zweeden, Rijsenhout, Netherlands

[73] Assignee: Multinorm B.V., Netherlands

[21] Appl. No.: 862,266

[22] Filed: May 12, 1986

[30] Foreign Application Priority Data

May 13, 1985 [NL] Netherlands ............... 8501365

[51] Int. Cl.$^4$ .............................................. A01M 7/00
[52] U.S. Cl. ........................................ 239/10; 239/74; 239/113; 239/127; 239/155
[58] Field of Search .............. 239/61, 62, 71, 74, 239/124, 127, 155, 156, 170, 302, 303, 304, 307, 308, 562

[56] References Cited

U.S. PATENT DOCUMENTS

| | | | |
|---|---|---|---|
| 2,757,044 | 7/1956 | Gerbracht | 239/62 X |
| 3,980,230 | 9/1976 | Pringle et al. | 239/61 |
| 4,052,003 | 10/1977 | Steffen | 239/155 X |
| 4,121,767 | 10/1978 | Jensen | 239/71 |
| 4,197,995 | 4/1980 | Campbell et al. | 239/74 |
| 4,274,585 | 6/1981 | Lestradet | 239/124 |
| 4,530,463 | 7/1985 | Hiniker et al. | 239/71 |

FOREIGN PATENT DOCUMENTS 3038334 10/1982 Fed. Rep. of Germany ........ 239/61

*Primary Examiner*—Andres Kashnikow
*Assistant Examiner*—Mary Beth O. Jones
*Attorney, Agent, or Firm*—John P. Snyder

[57] ABSTRACT

A method and an apparatus for the spraying onto a field of a liquid such as a herbicide solution by means of a spraying apparatus, propellable over the field, with a series of spraying members (3) fed by a common liquid pressure pump (6) wherein a carrier fluid is supplied to the spraying members (3) by means of the pump and the active substance in the stream of carrier fluid is added by means of a second regulatable pump (12), wherein the volume of carrier fluid provided to the spraying means (3) is controlled dependantly on the quantity of active substance by a regulating system (5) controlling one of the two fluid flows, in order to keep the concentration of active substance in the carrier fluid constant irrespective of the travel velocity, ensuring that although the quantity of the active substance is regulated dependantly on the travel velocity, the concentration is independant thereof, resulting in a homogeneous spreading of the active substance over the full width of the strip of land to be sprayed.

18 Claims, 2 Drawing Figures

METHOD AND AN APPARATUS FOR SPRAYING A LIQUID

This invention relates to a method for the spraying onto a field of a liquid such as a herbicide solution by means of a spraying apparatus, propellable over the field, with a series of spraying members fed by a common liquid pressure pump, wherein a carrier fluid is supplied to the spraying members by means of the pump and the active substance in the stream of carrier fluid is added by means of a second regulatable pump.

With an apparatus of the above kind liquid can be sprayed onto the field over a considerable breadth, dependant on the number of adjacently arranged spraying members, in a single working pass. This spray of liquid must be, both in the quantity and in the concentration of the active substance, as homogeneous as possible over the full breadth and the full length of the path travelled, in order to prevent irregular growth patterns in the crop standing in the field. In the known systems, a flow control is applied for this purpose based on the maintenance of constant pressure in the spray lines. Should the pressure in the line become too high, a portion of the liquid is then fed back to the supply tank, whereby the nominal pressure is restored. This has disadvantages since as a consequence of blockage or wear, and after replacement of the spraying members, the pressure in the system is admittedly maintained at a defined level, but the quantity of liquid distributed over the field by the spraying members is not maintained, as a result of which undesirable irregularities of growth can occur. Furthermore, in the known system the active substance is mixed in the supply tank. The disadvantage of this is that, should the supply tank not become completely emptied during spraying, it is difficult to discharge the residue responsibly as refuse. Moreover, the often expensive active substance is hereby wasted. In another control system, the volumetric flow of carrier fluid is held constant. The active substance is herein added by an adjustable dosing pump in a quantity which is dependant on the speed of travel. Although one of the disadvantages of the pressure regulation system is hereby overcome, there remains a disadvantage in that the concentration of the active substance at the spraying members changes according to the speed of travel. Since the length of the supply lines to the various spraying members is not the same in all cases, liquid having the same concentration of active substance will not arrive simultaneously at all the spraying means, which in practice will be the case only after some tens of meters have been travelled at the new speed. This results in irregular growth of the crop.

The present invention has for its object to eliminate the above disadvantages, and provides to that end a method which is distinguished in that the volume of carrier fluid provided to the spraying means is controlled dependantly on the quantity of active substance by a regulating system controlling one of the two fluid flows, in order to keep the concentration of active substance in the carrier fluid constant irrespective of the travel velocity.

With the present method it is ensured that the concentration of liquid for the spraying means is constant, so that, although the quantity of the active substance is regulated dependantly on the travel velocity, the concentration is independent thereof. This results in a homogeneous spreading of the active substance over the full breadth of the strip of land to be sprayed. Moreover, the quantity of active substance which emerges from the spraying means is, without time-delay, equal to that determined by the setting of the control system.

The invention further relates to an apparatus for carrying out the above-stated method, which apparatus is provided with a series of spraying members, fed by a common pump for a carrier fluid via a pressure line, and also a second regulatable pump for the supplying of an active substance into the carrier fluid. The apparatus according to the invention is distinguished in that the pressure pump is of the regulatable type.

According to one embodiment, good mixing can be achieved by connecting the exit of the second regulatable pump for the active substance to a static mixer incorporated in the pressure line of the first pump.

In another embodiment, good mixing is achieved by adding the active substance to the suction line of the first pump for the carrier fluid.

The control circuit can react to the speed of travel, the flow of liquid, the spraying pressure and the number of spraying members in operation, and can be adjusted for a desired concentration of active substance in the liquid and the desired quantity of active substance per unit surface area.

Figure 2:
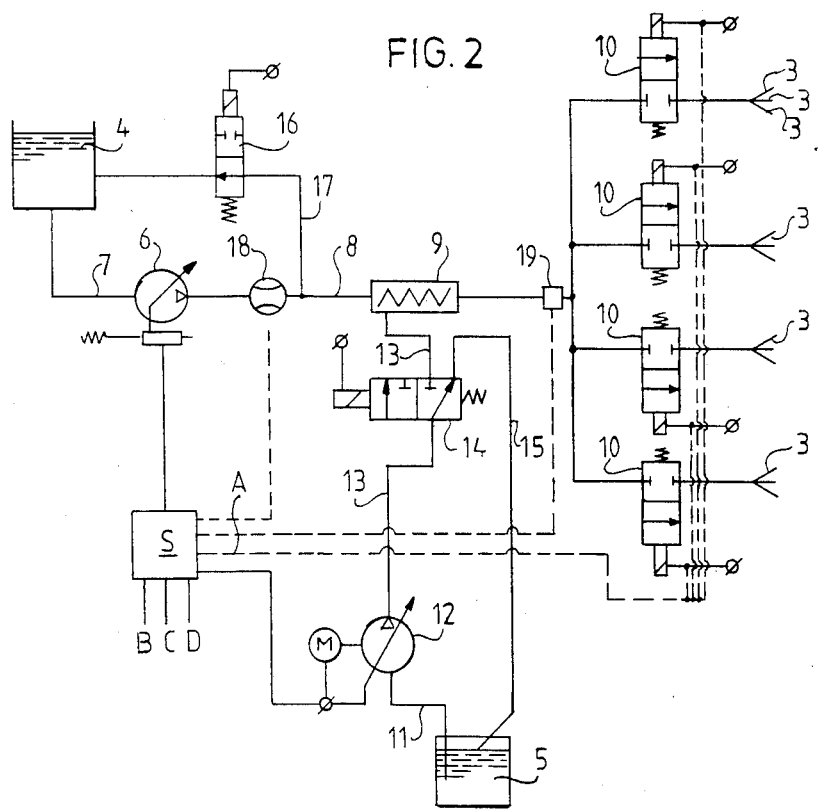

The invention will be further explained in the description of the figures, below, of an embodiment example. In the drawings:

FIG. 1 shows a rear perspective of a spraying apparatus which is carried by an agricultural tractor, FIG. 2 shows a schematic diagram of the spraying system applicable to the apparatus of FIG. 1, provided with a control circuit for the adjustment of the liquid pump and the dosing pump.

In FIG. 1, number 1 indicates the agricultural tractor, to the rear of which is fitted horizontally extending boom 2, on which a number of spraying members 3 are adjacently arranged. Boom 2 consists normally of a number of sections fitted hingeably with respect to one another, each section having its own group of spraying members 3 which can be separately set in operation. Also fitted to the tractor is supply tank 4 for feeding spraying members 3.

The spraying system involved in an apparatus of this kind is shown schematically in FIG. 2. Here, also, number 4 indicates the supply tank, which serves for the storage of a certain quantity of a liquid, such as water, which is necessary to spray the active substance, such as fungicide or herbicide, stored in a second supply tank.

Adjustable pump 6 is connected to supply tank 4 via a feeding line 7. The output side of adjustable pump 6 is connected via flow-meter 18 to a line 8 which leads via static mixer 9 to spraying-heads 3. Line 8 is therefore split after mixer 9 first into four sections and then into a number of spray-heads per section. Each section is closable by means of electrically controllable valve 10. The second supply tank 5 containing the active substance is connected via line 11 to dosing pump 12, of which the exit leads via line 13 to static mixer 9. In line 13 is fitted electrically operable valve 14 which is also connected to supply tank 5 by return line 15. Line 8 is connected via flow-meter 18 and before static mixer 9 via, by electrically operable valve 16 closable, line 17 to supply tank 4.

Control circuit S is schematically indicated in the diagram by broken lines and is for example coupled to the electrical controllers A of valves 10 of the spraying sections. The control circuit serves to set adjustable pumps 6 and 12 to give a specific yield.

Control circuit S can further be provided with information signals which originate from, for example, the speedometer of tractor B, the required quantity of the substance to be distributed per unit surface area C, the desired concentration of substance D and the required spraying breadth.

Obviously, other input signals are possible for control circuit S.

The above-described spraying system works as follows. Upon activation of pump 6 by means of a not-shown drive motor or a power take-off of the tractor, a determinate quantity of liquid per unit time is carried via line 8 to spraying members 3 at a given rotary speed of the pump. It is assumed here that valve 16 is closed and valve 10 of each section is open. Consequent to the activation of pump 12 driven by motor M, the active substance is drawn out of supply tank 5 and carried via valve 14 placed in the one position to static mixer 9. There takes place there a mixing of the carrier liquid and the active substance, so that a predetermined mixture is offered to the spraying members.

The adjustment of pump 6 can take place by the prior input of data to control circuit S, dependent on the set and/or measured speed of travel, the desired concentration of the active substance and the desired quantity of spray liquid per unit area, the control circuit responding to the flow-meter 18 and the number of opened valves 10 in each spraying section. The control circuit determines the correct setting for pump 6, so that a particular quantity of liquid is supplied to spraying members 3, and also determines the quantity of active substance through the setting of pump 12.

When a given section of the spraying system is closed down, the position of valve 10 is instantly passed to control circuit S so that both pumps 6 and 12 are readjusted so that the supplied volume of liquid and the concentration remains the same per spraying member.

Besides the regulation of the concentration of the active substance, a means of regulation is also conceivable wherein the spraying pressure is held at a specific value in order to realize a desired pattern of drops. A pressure sensor 19 should be included in pressure-line 8.

After termination of spraying, injection pump 12 is stopped and, through continued flowing of the liquid, all lines and spraying heads are cleaned with the fresh liquid from tank 4. After cleaning, tank 4 can simply be emptied.

The invention is not limited to the above-described embodiment. Thus it is possible to replace dosing-pump 12 for the active substance by another type, for example a dosing-pump which is fed by the liquid under pressure from supply tank 4, so that the driving can also take place via pump 6.

The embodiment of adjustable pump 6 can have any required form, the preference being given however to a plunger pump of which the stroke-length, and thus the yield, is adjustable.

I claim:

1. A method for spraying a liquid admixture such as a herbicide solution onto a field, which comprises the steps of:

(a) separately pumping a carrier liquid and an active liquid into admixture with each other to obtain a finite, desired concentration of the active liquid in the carrier liquid and discharging the liquid admixture at such finite, desired concentration in the form of spray;

(b) directing the sprayed liquid admixture onto a field while it is being swept at a controlled speed of travel over the field; and (c) varying the quantity per unit of time at which the finite, desired concentration of liquid admixture is sprayed in accord with variations of the speed of travel to effect a uniform distribution of the active liquid onto the field.

2. The method as defined in claim 1 wherein, in step (a), the discharge of the liquid admixture is effected in a plurality of sprays and including the step of independently controlling the discharge per unit time at each of the sprays.

3. The method as defined in claim 2 wherein, in step (a), the finite, desired concentration is controlled both as to the amount of carrier liquid pumped and the amount of active liquid pumped to control the pressure of liquid admixture supplied to the sprays and the relative concentration of the active liquid relative to the carrier liquid in achieving the finite, desired concentration.

4. An apparatus for covering a field with a uniform distribution of an active fluid despite the speed of travel of the apparatus over the field, which comprises a vehicle for travel over the field, a series of spraying members carried by said vehicle, a supply of carrier fluid and a supply of active fluid, first pump means for feeding carrier fluid to the spraying members and second pump means for admixing the active fluid with the carrier fluid to obtain a finite concentration of the active fluid relative to the carrier fluid before the admixture is fed to the spraying members, and control means responsive to speed of travel of the vehicle for varying the quantity per unit of time at which the finite concentration of the active fluid in the carrier fluid is fed to the spraying members to effect a uniform distribution of the active fluid onto the field.

5. An apparatus as claimed in claim 4 including a static mixer joining the fluid from the two pump means.

6. An apparatus as claimed in claim 4 the exit of the second pump means is connected to the suction of the first pump means.

7. An apparatus as claimed in claim 4 wherein said control means includes a flow meter.

8. An apparatus as claimed in claim 5 wherein said control means includes a flow meter.

9. An apparatus as claimed in claim 6 wherein said control means includes a flow meter.

10. An apparatus as claimed in claim 4 wherein said control means includes a pressure sensor incorporated in a pressure line feeding said spraying members.

11. An apparatus as claimed in claim 5 wherein said control means includes a pressure sensor incorporated in a pressure line feeding said spraying members.

12. An apparatus as claimed in claim 6 wherein said control means includes a pressure sensor incorporated in a pressure line feeding said spraying members.

13. An apparatus as claimed in claim 7 wherein said control means includes a pressure sensor incorporated in a pressure line feeding said spraying members.

14. The method of spraying a field over a wide swath with a solution of an active liquid in a carrier liquid while maintaining a uniform distribution of the active liquid over the field in the presence of variations in the speed at which the swath is generated, which comprises the steps of providing a separate supply of the carrier liquid, providing a separate supply of the active liquid, pumping a stream of the carrier liquid to a plurality of spray heads which extend over the transverse width of the swath, traveling the spray heads over a field to generate the swath and varying the quantity of carrier liquid pumped to the spray heads in dependence upon the speed of travel so that the quantity of carrier liquid per unit of surface area being sprayed is substantially constant, and introducing the active liquid into the pumped stream of carrier liquid upstream of the spray heads in amount dependent upon the speed of travel to maintain a substantially constant concentration of the active liquid in the stream of carrier liquid pumped to the spray heads.

15. The method as defined in claim 14 including the step of pumping the active liquid into the pumped stream of carrier liquid.

16. The method as defined in claim 15, including the step of terminating the pumping of the active liquid into the stream of carrier liquid while continuing the pumping of the carrier liquid to the spray heads so as to cleanse the spray heads while preserving the supply of active liquid.

17. The method as defined in claim 15 including the step of individually controlling the quantity of liquid discharged at each spray head.

18. The method as defined in claim 16 including the step of individually controlling the quantity of liquid discharged at each spray head.

* * * * *